United States Patent [19]

Ide

[11] Patent Number: 5,048,622

[45] Date of Patent: Sep. 17, 1991

[54] HERMETICALLY SEALED PROGRESSIVE CAVITY DRIVE TRAIN FOR USE IN DOWNHOLE DRILLING

[76] Inventor: Russell D. Ide, P.O. Box 744, 641 Arnold Rd., Coventry, R.I. 02816

[21] Appl. No.: 540,693

[22] Filed: Jun. 20, 1990

[51] Int. Cl.[5] .......................... E21B 4/02; F01C 1/10; F16D 3/16; F16D 3/50

[52] U.S. Cl. .................................. 175/107; 175/101; 403/57; 418/48; 418/182; 464/112; 464/160

[58] Field of Search ................ 175/107; 464/112, 160, 464/106, 153; 418/48, 182; 403/57, 58, 74

[56] References Cited

U.S. PATENT DOCUMENTS

| | | | |
|---|---|---|---|
| 3,986,370 | 10/1976 | Garrison | 175/107 X |
| 3,999,901 | 12/1976 | Tschirky | 175/107 X |
| 4,080,115 | 3/1978 | Sims et al. | 175/107 X |
| 4,157,022 | 6/1979 | Crase | 464/19 X |
| 4,263,788 | 4/1981 | Beimgraben | 464/19 X |
| 4,449,953 | 5/1984 | Nikomarov et al. | 175/107 X |
| 4,548,591 | 10/1985 | Haldric et al. | 464/160 X |
| 4,679,638 | 7/1987 | Eppink | 464/19 X |
| 4,772,245 | 9/1988 | Readman et al. | 464/160 X |

FOREIGN PATENT DOCUMENTS 2129524  5/1984  United Kingdom ................ 464/112

*Primary Examiner*—Stephen J. Novosad
*Attorney, Agent, or Firm*—Marks Murase & White

[57] ABSTRACT

A drilling apparatus having progressive cavity drive train which includes a progressive cavity device and a coupling for converting the complex motion of the rotor into simple rotation. The coupling includes a sealed universal joint assembly coupling yokes formed on a first stub shaft to yokes formed on the second stub shaft. The sealed universal joint assembly includes a cross member assembly having a cross member and a sealing cup. The cross member has a central body and two sets of pin portions extending from the body. Each set of pin portions includes two pin portions having coincident axes. The pin portions of one set are transverse to the pin portions of the other set. The sealing cup is fixed to each of the pin portions of the cross member. The sealing cup includes connecting sleeve portion fixed to the pin portion of the cross member, a flexible elastomeric section secured to the sleeve portion and a hollow upon portion enclosing the end of the pin portion. Each hollow cup portion has an interior surface and an exterior surface. A portion of the interior surface is in sliding contact with the pin portion enclosed by the sealing cup. The exterior of the cup portion being fixed to a yoke member by bonding or the like. Preferably, there are two such cross members in each joint assembly. The two cross members are coupled to one another by an intermediate shaft such that the entire assembly pivots like a double Hooke's joint. The elastomeric section of the sealing cup is sufficiently flexible to allow pivoting of the pin portion and sleeve portion with respect to the cup portion. The yoke member and the sleeve portion are sealingly connected to the pin portion such that the interior of the cup portion is hermetically sealed.

29 Claims, 6 Drawing Sheets

HERMETICALLY SEALED PROGRESSIVE CAVITY DRIVE TRAIN FOR USE IN DOWNHOLE DRILLING

BACKGROUND OF THE INVENTION

This invention relates to a progressive cavity apparatus, and more particularly to drive trains for progressive cavity downhole drilling devices.

The use of progressive cavity or single-screw rotary devices is well known in the art, both as pumps and as driving motors. These devices have a single shaft in the shape of one or more helix contained within the cavity of a flexible lining of a housing. The generating axis of the helix constitutes the true center of the shaft. This true center of the shaft coincides with its lathe or machine center. Typically, the lined cavity is in the shape of a two or more helices (one more helix than the shaft) with twice the pitch length of the shaft helix. Either the shaft or the housing is secured to prevent rotation; the part remaining unsecured rolls with respect to the secured part. As used herein, rolling means the normal motion of the unsecured part of progressive cavity devices. In so rolling, the shaft and housing form a series of sealed cavities which are 180 degrees apart. As one cavity increases in volume, its counterpart cavity decreases in volume at exactly the same rate. The sum of the two volumes is therefore a constant.

When used as a motor for down hole drilling, the unsecured part or rotor produces a rotor driving motion. The driving motion of the rotor is quite complex in that it is simultaneously rotating and moving transversely with respect to the stator. One complete rotation of the rotor will result in a movement of the rotor from one side of the stator to the other side and back. The true center of the rotor will of course rotate with the rotor. However, in a typical construction, the rotation of the true center of the rotor traces a circle progressing in the opposite direction to the rotation of the rotor, but with the same speed (i.e., reverse orbit). Again, optimum performance is obtained when movement of the rotor is precisely controlled. One complete rotation of the rotor will result in one complete rotation of the true center of the rotor in the opposite direction. Thus, the rotor driving motion is simultaneously a rotation, an oscillation, and a reverse orbit. For multi-lobe motors the reverse orbit is a multiple of the rotational speed, e.g., if a three lobe motor is used the reverse orbit is three times as great as the rotational speed.

Examples of progressive cavity motor and pump devices are well known in the art. The construction and operation of such devices may be readily seen in U.S. Pat. Nos. 3,627,453 to Clark (1971); 2,028,407 to Moineau (1936); 1,892,217 to Moineau (1932) and 4,080,115 to Sims et al. (1978).

Despite the simple construction of progressive cavity devices, use of the devices as motors in driving and drilling apparatus have proven difficult. This difficulty results primarily from the failure to provide a drive train capable of handling the complex rotor driving motion (described above) in a durable, reliable and inexpensive manner. Couplings that connect the rotor of progressive cavity motors with the drill must be capable of operating in a contaminated, hostile environment while handling a very high torque and transmitting the rotational output of the rotor without the orbital motion of the rotor.

Attempts have been made to convert the complex rotor motion into rotational motion for driving a drilling shaft. Of the couplings which have been used in progressive cavity devices, the most commercially successful has been a universal joint attached to the driving end of the rotor and connected to a universal joint attached to the driven drill shaft. As is known, such U-joints react or resolve the orbital motion by the sliding of pin members in a universal assembly. Thus, such joints typically include elements which slide relative to one another.

The principal on which the Hooke's type of universal assembly works is illustrated in FIG. 3. The shaft A is formed into a fork or yoke at its end and pivoted between the prongs of this fork is a cross-piece C. The cross-piece C can therefore pivot about the XX relatively to the shaft A. The other shaft B similarly includes a fork or yoke at its end and the other arms of the cross are pivoted between the prongs of this fork. The shaft B can therefore pivot about the axis YY relative to the cross C and, since the latter can pivot about the axis XX relative to the shaft A, the shaft B can assume any angular position relative to shaft A. It follows that if the shafts A and B are supported in bearings with their axes at an angle, then when the shaft A is turned about its axis, the motion is communicated to the shaft B and it turns about its axis; the arms of the cross meanwhile oscillating in the prongs of the forks.

The axes XX and YY intersect at O and are perpendicular to one another. The axes of the arms of the cross C are also perpendicular to their respective shafts. The axes of the shafts A and B also intersect at O, which point is commonly referred to as the "center" of the joint.

Although FIG. 3 shows a specific pivoting connection, it does not matter how the pivoting action is obtained. All that is required is that the shaft B shall be able to pivot independently about two intersecting perpendicular axes such as XX and YY, relatively to shaft A. There are many known constructions for achieving this result.

The single Hooke's type of universal assembly described above suffers from a disadvantage which is obviated in some other forms of the joint. Specifically, when two shafts are connected by a single Hooke's joint and one of these shafts is rotating at an absolutely constant speed, then the other shaft will not rotate at a constant speed but at a speed that is, during two parts of each revolution, slightly greater and, during the other two parts of the revolution, slightly less than the constant speed of the first shaft, i.e., the velocity varies cyclicly. The magnitude of this fluctuation in speed depends on the angle between the axes of the two shafts, being 0° when that angle is 0° but becoming considerable when the angle is large. This disadvantage becomes of practical importance in applications such as downhole drilling where it is important to maintain a constant speed. The disadvantage can be obviated by using two Hooke's joints arranged (as shown in FIG. 2) with an intermediate shaft arranged so that it makes equal angles between the first and second stub shafts and the pivot axes of the intermediate shaft being arranged parallel to each other. The irregularity introduced by one joint is then cancelled out by the equal and opposite irregularity introduced by the second joint.

Past attempts to apply universal joints to downhole motors have suffered from several disadvantages, particularly in the area of reliability. The primary reason for this is that the fluids used in progressive cavity drilling apparatus often are or quickly become abrasive. This abrasive fluid flows between the relative moving (sliding) surfaces of the U-joint causing rapid wear.

In the past, there have been attempts to isolate the sliding pivot surfaces of a universal from contaminants or heavy vibrations. Examples of such constructions are shown in U.S. Pat. No. 2,727,370 to Holland; U.S. Pat. No. 3,262,284 to Maxwell-Holroyd; U.S. Pat. No. 3,545,232 to Neese et al.; and U.S. Pat. No. 4,861,314 to Mazziotti. However, in such known cases there is always sliding between the seal and one of the surfaces of the U-joint components. As a result of this sliding, the seal is not truly hermetic and the U-joint components are not perfectly isolated. Thus, the possibility of contamination exists, particularly in a high pressure application such as down hole drilling.

Another type of universal joint assembly for use in downhole motor drives is disclosed in U.S. Pat. No. 4,772,246 to Wenzel. This patent discloses a pressure equalization arrangement which significantly reduces the pressure differential across the seal. As a result, the likelihood of leakage of drilling mud into the universal joint is reduced. Despite the advantages it offers, this construction is complicated and expensive. Further, the U-joint components are not perfectly isolated because the seal is not hermetic. Consequently, there is some possibility of contamination of the U-joint assembly.

Thus, while the need to seal, to some extent, the components of a U-joint has been recognized, the need to perfectly isolate these components and a reliable means of achieving this are not known in the prior art.

SUMMARY OF THE INVENTION

The present invention obviates the problems associated with known progressive cavity devices by providing a progressive cavity drive train including a progressive cavity device and a hermetically sealed universal joint which converts the complex motion of the rotor into simple rotation of the drill shaft. The drive train is inexpensive, reliable and durable in comparison to known progressive cavity drive trains.

The present inventor has found that a universal type joint is most reliable when the sliding components of the joint are perfectly isolated from the surrounding environment. Further, the present inventor has discovered that, despite the relative movement between U-joint components, it is possible to perfectly isolate or hermetically seal these components in a U-joint used in a progressive cavity downhole drilling drive train. In part, the present invention is the result of the present inventor's recognition that universal joints can be designed to resolve the complex motion of a downhole drilling progressive cavity drive train without large angular deviations between adjacent shafts in the universal assembly. In fact, by making the U-joint sufficiently long, the rotor motion can be resolved by a universal joint, the shaft portions of which are typically not skewed by more than 5°. This means that in a U-joint for a downhole drilling assembly the amount of movement between the relatively movable portions is normally less than 0.05 inches. It follows that U-joints specifically designed for use in downhole drilling progressive cavity devices do not need to have the flexibility typically required of U-joints. Recognizing this has enabled the present inventor to design a universal joint with limited, but sufficient, flexibility and perfectly isolated sliding components.

In accordance with the present invention, a conventional double Hooke's joint coupling is made into a hermetically sealed coupling through the use of a sealing connecting cup. Generally, the sealing connecting cup includes a first portion which is adapted to be rotatably fixed to the shaft portion, a second portion which is adapted to be secured to the cross member and an elastomeric portion bonded to the first and second portions allowing limited torsion between the first and second portions but maintaining a seal therebetween. The cross member further includes a surface which slides on the interior of the first portion of the sealing cup so that load between the shaft and the cross member is transmitted directly through the first portion. By virtue of the sealed connection of the cup assembly, the surface of the cross member which slides in the interior of the first portion is in a hermetically sealed environment.

Thus, the present invention relates to a progressive cavity drive train in which the complex rotor motion is resolved by a U-joint coupling (preferably having U-joints at each end of the coupling), which is modified such that the sliding components are perfectly isolated by hermetic rubber/elastomer seals that stretch rather than slide to maintain seal integrity. The U-joint is of the type wherein the yokes of adjacent shafts are coupled by cross-pieces or members. The cross member includes two sets of pin portions. The pin portions of one set are transverse to the pin portions of the other set. One set of pin portions is slidably mounted in the yoke of one shaft and the other set of pin portions is similarly mounted in the yoke of an adjacent shaft. Seals are securely fixed to both the pin and the shaft. The seals are capable of stretching to accommodate movement between the shaft and pin. The standard sliding or pin connection arrangement that affects a high torque universal is located within the sealed region and are thus hermetically sealed. Preferably, this construction is achieved by a structure in which the cross member of the universal and the respective shaft portions of the universal are connected to one another through a sealing connecting cup. It is also possible to directly connect the seals to the pin and yoke. However, this complicates manufacture.

The sealed U-joint is used in the progressive cavity drive train of the present invention which includes a housing structure, a stator having a longitudinal axis, a rotor having a true center and being located within the stator, first and second stub shafts and an intermediate shaft coupling the stub shafts through sealed cross member assemblies in a universal type fashion.

The stator and the rotor have coacting helical lobes in contact with one another at any transverse section. The stator has one more helical lobe than the rotor such that a plurality of cavities are defined between the rotor and the stator. The rotor is adapted to rotate within the stator such that the true center of the rotor orbits the axis of the stator; the orbit has a predetermined radius. The orbit is constant and not subject to change such that the rotor motion can be precisely controlled. The orbit of the rotor causes progression of the cavities in the direction of the axis of the stator.

The first stub shaft has a longitudinal axis and first and second longitudinal ends; the first end of the first stub shaft is connected to and movable with the rotor; the second end of the first stub shaft is formed into a fork or yoke with at least two aligned openings or directly connected to such an assembly or some other joint component.

The second stub shaft has a longitudinal axis which is substantially colinear with the axis of the stator and first and second longitudinal ends; the second stub shaft is supported in the housing so that its longitudinal axis is fixed and the second stub shaft is rotatable about its longitudinal axis; the second end of the second stub shaft is formed into a fork or yoke with at least two aligned openings, or directly connected to such an assembly or some other portion of a joint assembly.

The intermediate shaft member is formed with a fork or yoke at each end or directly connected to such an assembly or some other joint portion. Each fork or yoke has at least two aligned openings. The intermediate shaft is coupled through the joint assemblies to the first stub shaft at one end and the second stub shaft at the other end in the known fashion such that the first, intermediate and second shafts are pivotally connected to one another via the joint assemblies in the manner of a double Hooke's joint.

The joint assemblies can consist of the yokes formed on or attached to the shaft ends and a cross member. The cross member may be a simple cross piece with perpendicular pins which intersect or the transverse pins may be offset to allow the use of larger pins to increase torque ability.

By virtue of this construction, the first stub shaft can rotate about its axis and orbit about the axis of the second stub shaft at the same time the second stub shaft rotates about its longitudinal axis. In this way, the complex rotor motion is resolved into simple rotation for driving the drill assembly of a downhole drill.

Thus, the drive train of the present invention includes a progressive cavity device and a sealed universal coupling. The progressive cavity driving device includes the stator, the cavity within the stator, the rotor within the stator cavity, and a passageway for flowing fluids through the stator. The sealed universal coupling includes the offset stub shafts, the intermediate shaft and the cross member assemblies coupling the stub shafts.

In operation, flow of fluids through the stator cavity produces the complex rotor driving motion. The sealed U-joint is secured to the end of the rotor protecting from the fluid discharge end of the stator. The U-joint converts or resolves the rolling of the rotor into a rotational motion substantially about a single axis at the same speed.

The present invention also provides an improved drilling apparatus which includes a drill string, a progressive cavity device, and a drill bit. The progressive cavity device is connected to the lower end of the drill string and includes a stator, a rotor within the stator, and means for flowing fluids through the stator to drive the rotor. The sealed U-joint coupling has a first stub shaft, a second stub shaft and intermediate shaft and a pair of cross members. The first stub shaft has a fork or yoke formed at one end with at least two aligned openings and the second stub shaft also has a similar fork or yoke formed at one end. The intermediate shaft has first and second ends with a yoke formed at each end. The intermediate shaft is coupled, via the cross members, to the first stub shaft at one end and the second stub shaft at the other end. The connection of the shafts via the couplings is such that the assembly functions as a double Hooke's joint. The drill bit has a tubular housing connected to the second end of the second stub shaft for rotation with the second stub shaft. The coupling converts the complex rotor motion into rotational drilling motion about an axis displaced from and parallel to said rotor axis. A flexible seal is fixed to both the yoke and the pins of the cross members so as to seal the sliding surfaces of the pins and yokes.

BRIEF DESCRIPTION OF THE DRAWINGS

Other objects, features, and advantages of the present invention are hereinafter set forth and explained with reference to the drawings wherein.

DETAILED DESCRIPTION OF THE DRAWINGS

Figure 1:
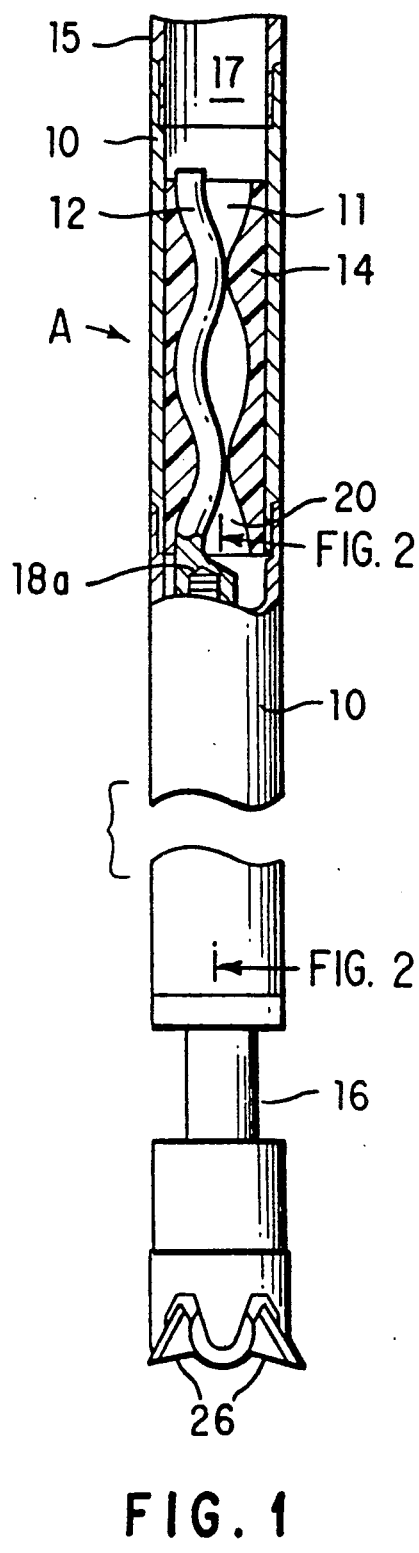
FIG. 1 is an elevation view partly in section of the overall structure of the downhole drilling apparatus of the present invention.

FIG. 1 shows the overall structure of a progressive cavity drilling apparatus using the progressive cavity drive train of the present invention. The apparatus includes a drill string 15, a progressive cavity drive train, a drill bit drive shaft 16 and a drill bit 26. The drive train of the present invention comprises a progressive cavity device and a sealed coupling for converting the motion of the rotor of the progressive cavity device, i.e., orbiting of the rotor and the rotational motion of the rotor, into rotation about a single axis at the same speed.

As illustrated in FIG. 1, the progressive cavity device A has a stator, a rotor, a passageway 11 for fluid to enter between the stator and the rotor, and a passageway 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 19 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a connecting portion 18a. The connecting portion 18a allows the rotor 12 to be connected to a stub shaft of the coupling (described below). The coupling is located in the lower part of the housing 10 and is not visible in FIG. 1.

As noted above, one end of the coupling is directly connected, by threading splining or the like, to the rotor shaft 12. The other end of the coupling is similarly connected to a drill bit drive shaft 16. Typically, the coupling includes separate stub shafts which are connected to the rotor shaft 12 and drive shaft 16 by connecting means such as threads, spines and the like. Of course, a stub shaft could be integrally formed (connected) to either of these shafts, if desired.

The drill bit drive shaft 16 is rotatably connected to a conventional drill bit 26.

The progressive cavity train of the present invention functions as a fluid motor or driving apparatus for driving the drilling apparatus shown in FIG. 1. Thus, a pressurized fluid, typically water carrying suspended particles commonly referred to as "mud", is forced into the progressive cavity device. The rotor 12 responds to the flowing fluid to produce a rotor driving motion which is simultaneously a rotation, an oscillation, and a orbit. The coupling, described below, attached to the rotor 12 at connection point 18a and aligned with the true center 28 of the rotor described above converts this rotor driving motion into rotational driving motion substantially about a single axis.

Figure 2:
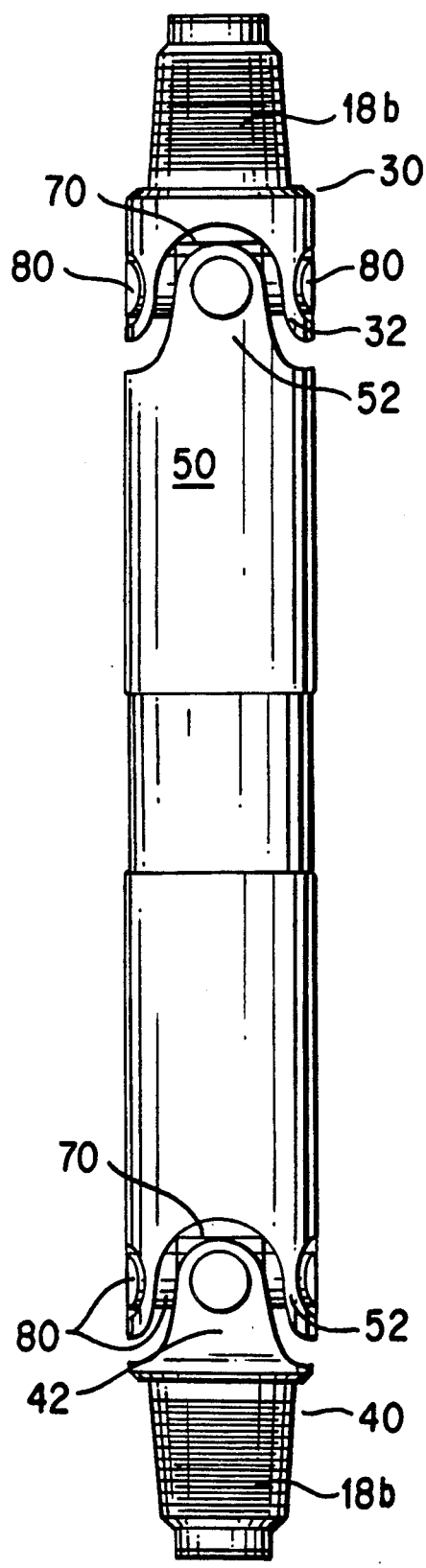
FIG. 2 is a side view of the sealed coupling of the present invention.

FIG. 2 shows the general construction of the coupling of the present invention somewhat schematically. Detailed views are shown in the other drawings. As shown in FIG. 2, the coupling includes a first stub shaft 30, a second stub shaft 40, an intermediate shaft 50, and two cross members 70. The cross members 70 connect the first stub shaft 30 to the intermediate shaft 50 at one end thereof and connect the second stub shaft 40 to the intermediate shaft 50 at the other end of the intermediate shaft 50.

The stub shafts 30, 40 each include a connecting portion 18b which allows the stub shafts to be connected to either the rotor 12 or the drill bit drive shaft 16 in the manner described above. Although a specific connecting means is shown, i.e., threads on the end of the stub shaft, other connecting means such as blinds, or the like, could be employed. Additionally, as mentioned above, the stub shafts could be formed integrally with either the rotor shaft 12 or the drill bit drive shaft 16.

The connection of the aforementioned components of the coupling is similar to that of a conventional double Hooke's joint universal. Specifically, the stub shafts 30, 40 each include a yoke, 32, 42 respectively, at one end thereof. The depiction of the yokes in FIG. 2 is somewhat schematic so as to illustrate portions of the cross member assembly including sealing connecting cup 80 and cross member 70. The yokes include at least two aligned openings 33, 43 for receiving the connecting portions of the cross members 70 (discuss below).

Likewise, the intermediate shaft 50 has a yoke 52 formed at each end thereof. Each yoke includes at least two aligned openings 43 for receiving the connection pin torsions of the cross members 70.

Figure 8:
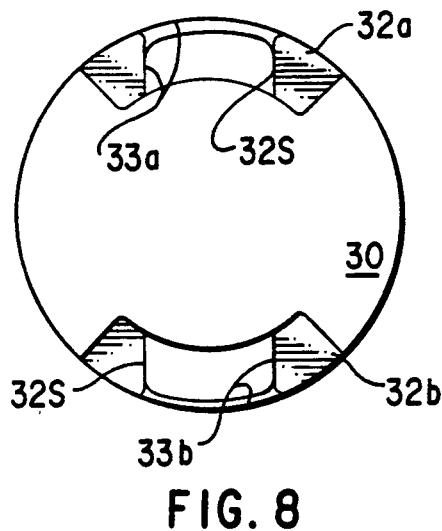
FIG. 8 is a top view of the yoke of FIG. 7.
Figure 7:
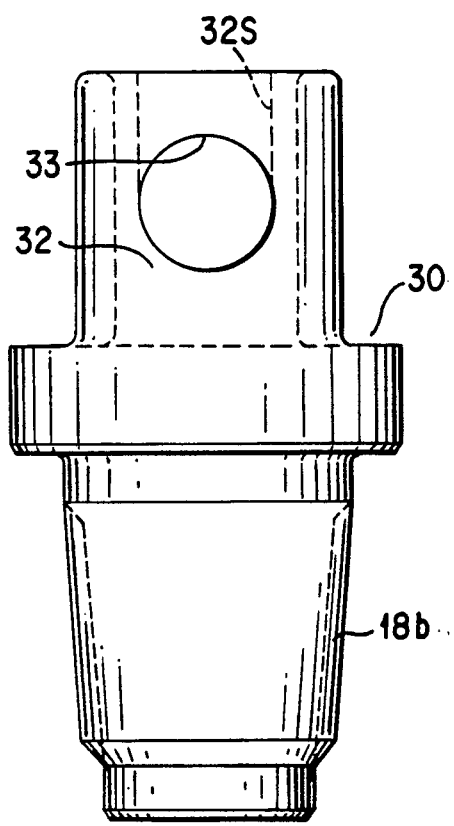
FIG. 7 is a side view of a stub shaft having a yoke formed at one end thereof.

In the illustrated embodiment, cross member 70 extending between the first stub shaft 30 and the intermediate shaft 50 is identical to the cross member 70 extending between the second stub shaft 40 and the intermediate shaft 50. The construction of the stub shafts is best illustrated in FIGS. 7 and 8. As shown therein, the stub shafts and the yoke formed therein are of the typical construction used in a universal coupling. Specifically, the stub shaft includes a connecting portion 18b which allows the stub shaft to be connected to another shaft such as the rotor shaft 12 or the drill bit driving shaft 16.

The stub shaft also includes a yoke portion 32 which includes two extensions 32a, 32b each extension having a cylindrical opening 33a, 33b respectively formed therein. The openings are aligned as best shown in FIG. 8. The specific yoke construction shown is conventional and, naturally, other conventional yoke configurations can be employed.

Figure 3:
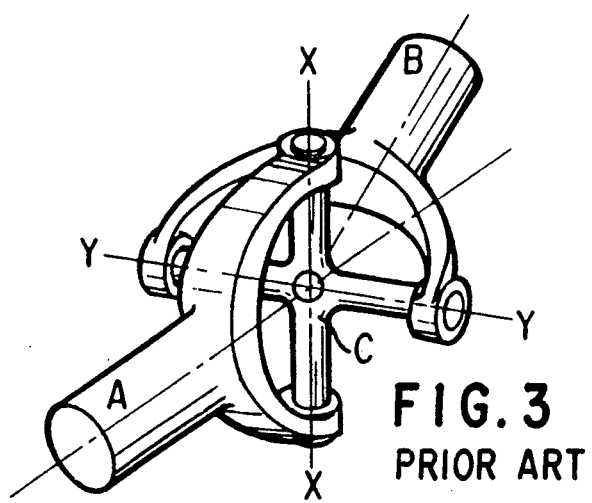
FIG. 3 is a perspective view of a conventional universal joint assembly.
Figure 5:
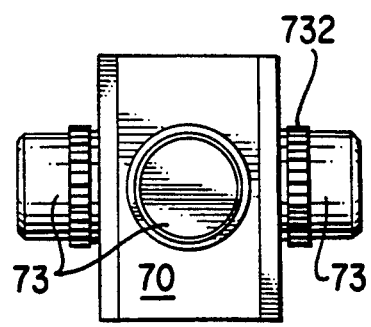
FIG. 5 is a side view of the cross member of FIG. 4.
Figure 6:
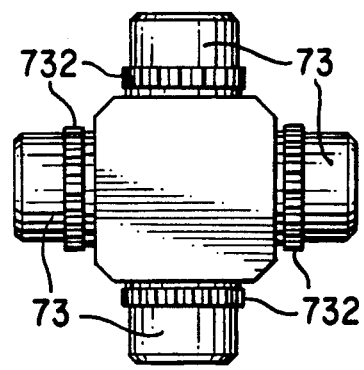
FIG. 6 is a top view of the cross member of FIG. 5.

The construction of the cross member is best shown in FIGS. 5 and 6. Like the construction of the yoke member, the construction of the cross member 70 is conventional. Specifically, cross member 70 includes four connecting pin portions 73. The connecting pin portions 73 are arranged in pairs and the two pairs of connecting pin portion 73 are transversely arranged with respect to one another. In this way, the cross member 70 has the same essential construction as the crosspiece C of FIG. 3. Again, other known forms of crosspieces can be substituted.

The cross member 70 and the yoke portions 32, 42, 52 of the shaft portions are assembled in a manner of a conventional double Hooke's joint universal with one important exception; there is no direct contact between the pin portion 73 of the cross member 70 and the aligned openings 33, 43 and 53 of the shafts. Instead, a sealing cup assembly 80 is located within the openings 33, 43, 53 and surrounds the pin portion 73 and is connected thereto so as to provide a hermetically sealed sliding surface for the transmission of torque from the yokes through the cross member to another yoke in the manner described below. By virtue of this hermetically sealed sliding surface, the sliding surfaces are perfectly isolated from the surrounding environment. The sealing cup together with the cross member can be considered a cross member assembly with the addition of shafts with yokes the assembly can be considered a coupling.

Figure 9:
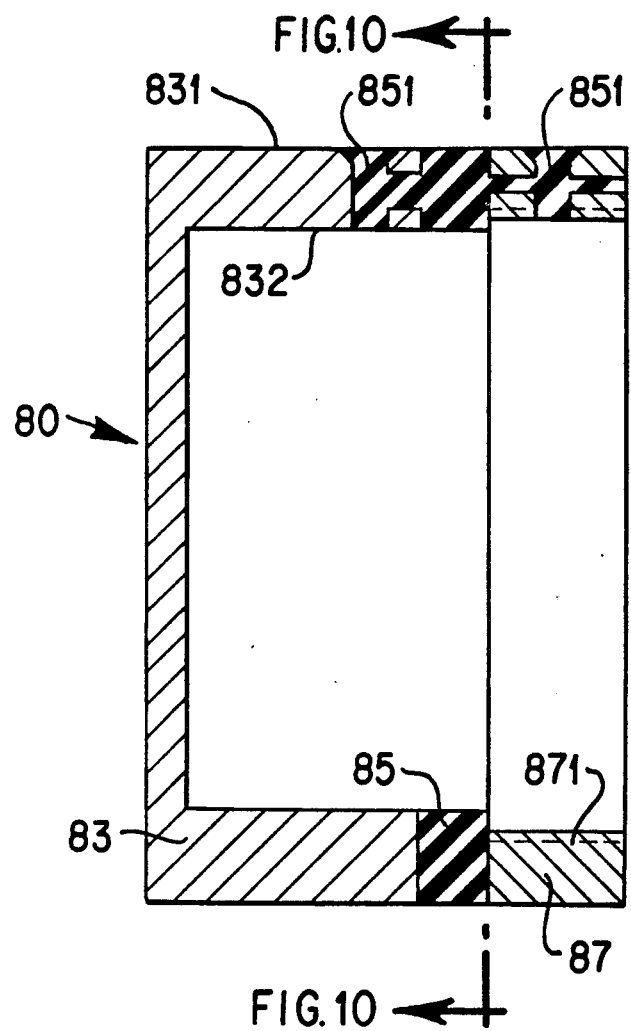
FIG. 9 is a side section of the sealing cup assembly of the present invention.
Figure 10:
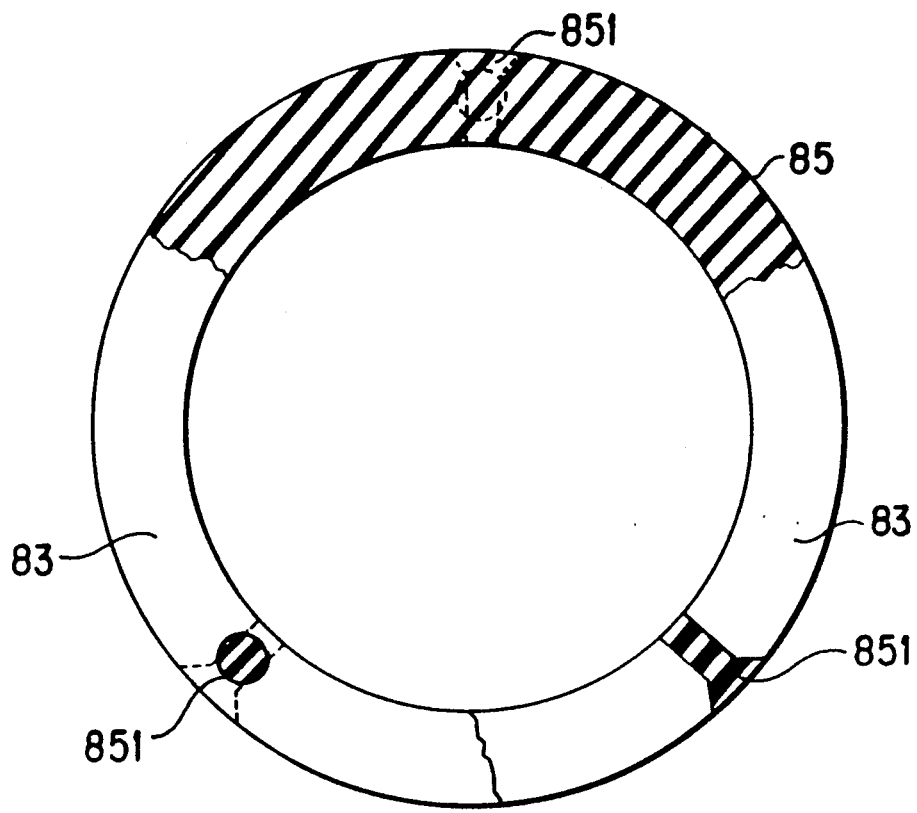
FIG. 10 is a cross section of the sealing cup assembly along the lines indicated in FIG. 9 with cut aways to illustrate the structure at various levels.

The construction of the sealing cup assembly can best be appreciated with reference to FIGS. 9 and 10. As shown therein, the sealing cup assembly 80 generally includes a cup-like yoke attachment or hollow cup portion 83, a flexible elastomeric torsion section 85 and a cylindrical cross member attachment or connecting sleeve portion 87. The elastomeric torsion element 85 is bonded to both the cup-like yoke attachment portion 83 and the connecting sleeve 87. A mechanical interlock 851 assists in maintaining joint integrity. The yoke attachment portion 83 has an outer surface 831 which is adapted to fit tightly into the openings 33, 43 or 53 of one of the shaft yokes 32, 42 or 52 of one of the shafts 30, 40, 50. Additionally, the yoke attachment portion 83 is adapted to be connected by bonding or some other means to the yoke portion in which it is fit. The elastomeric torsion portion 85 has a generally cylindrical configuration but includes a mechanical interlock in the form of a plurality of locking extensions 851 which fit into openings formed in the yoke connecting portion 83 and the cross member connecting portion 87 to insure that the portions 83, 85 and 87 are permanently and sealingly connected to one another. FIG. 10 is cut away at two levels to better illustrate the locking extensions 851. The cross member connecting portion 87 includes means such as splines, screws or bonding for nonreleasely attaching to a portion of the cross member 70. The connection should also be fluid tight. In the example shown in FIG. 9, the cross member connecting portion 87 includes splines 871. These splines are adapted to engage with similar splines such as those shown at 732 in FIGS. 5 and 6 to form the required fluid tight connection.

Figure 4:
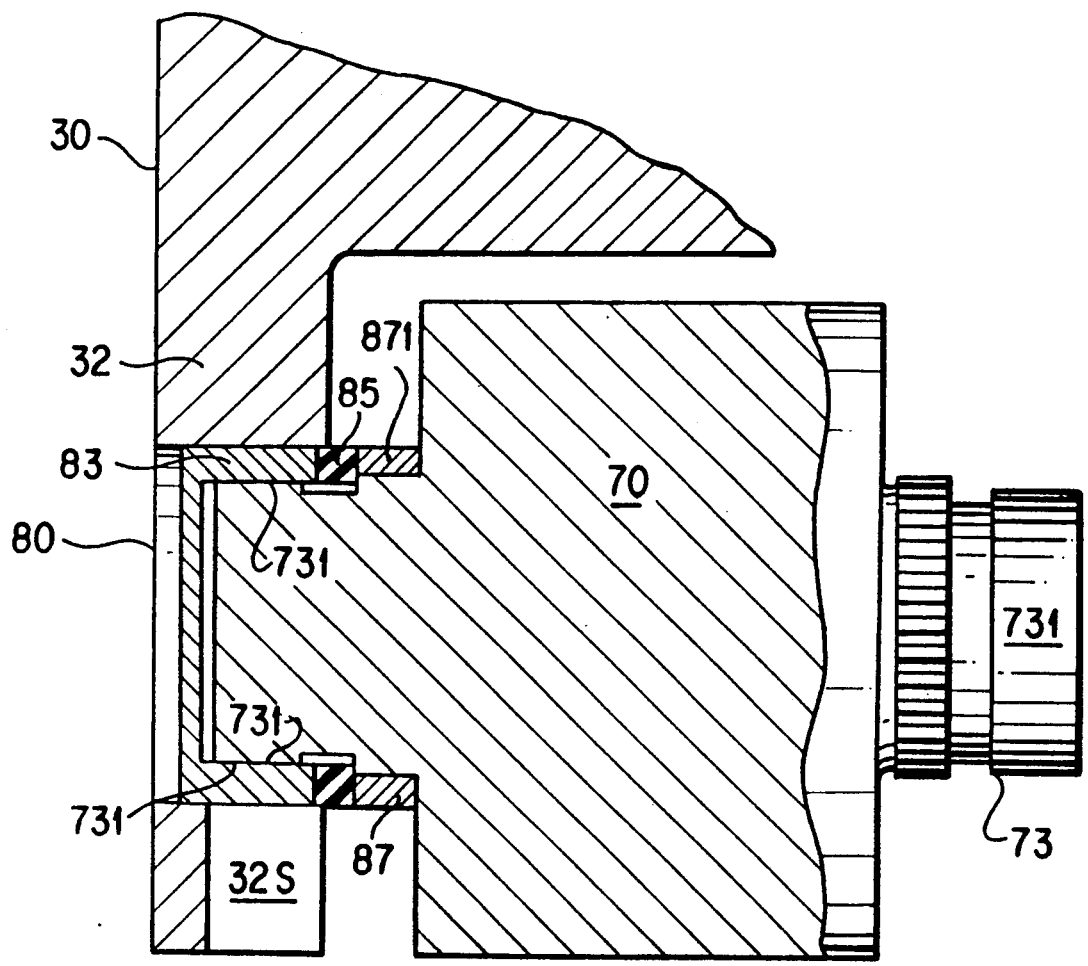
FIG. 4 is a sectional detail view showing the relationship between a cross member, a yoke portion and a sealing connections cup.
Figure 11:
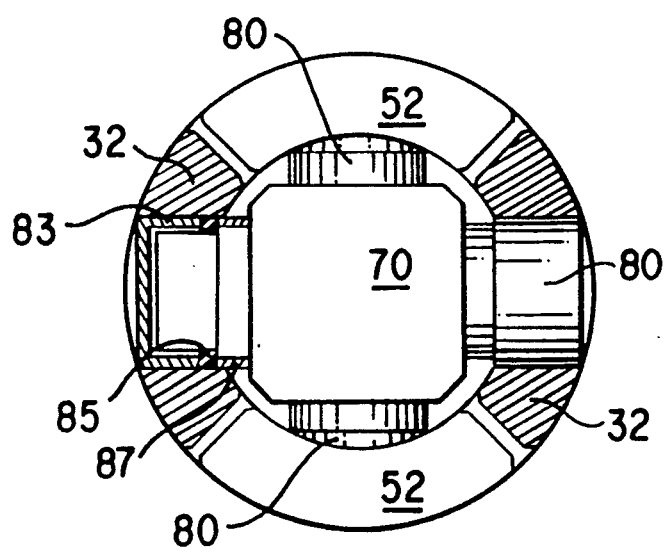
FIG. 11 is a view along the longitudinal axis of the universal joint partially cut away to detail the interrelationship of a yoke, the sealing cup assembly and a cross member.

FIG. 4 shows a partial view of a cross member 70, a sealing cup assembly 80 and a yoke 30 in the assembled state. Similarly, FIG. 11 shows a longitudinal end view of an assembly coupling with yoke 32 cut to show the cross member assembly. In this assembled state, the yoke connecting portion 83 of the sealing cup assembly 80 is fixedly secured to the yoke 32 so that it, in effect, functions as a portion thereof. Likewise, the cross member connecting portion 87 is fixedly connected to the cross member 70 so that it, in effect, functions as part thereof. Thus, the torsion member 85, in effect, extends between the yoke and the cross member and is fixedly secured to each of these members. Thus, as best shown in FIG. 4 the region between the inner surface 832 of the cross member and the outer periphery of the pin portions 73 is hermetically sealed.

In accordance with an important aspect of the present invention, either the interior surface 832 of the sealing cup assembly 80 or the exterior surface of the pin portion 73 is dimensioned such that in the assembled state, as shown in FIG. 4, a portion of these surfaces are in sliding contact. This may be accomplished by either providing a protrusion or sleeve on the interior surface 832 of the sealing cup assembly 80 or providing a radially outward extending protrusion or sleeve on the exterior surface of the pin portion 73. FIG. 4 illustrates an example of a protruding surface 731 formed on the pin portions 73. The protrusions do not have to be as pronounced as shown in FIG. 4. It is only necessary that sliding contact between the interior surface of the sealing cup and the outer periphery of the pin portions be obtained in some way. In either case, when assembled, there is sliding contact between the interior surface 832 of the yoke connecting portion 83 of the sealing cup assembly, which as noted above, functions as a part of the yoke, and the cross member. Thus, torque can be transmitted in the usual manner between the yoke and the cross member. However, by virtue of the hermetic seal formed by the torsion member 85, these sliding surfaces are perfectly isolated from the surrounding environment.

As best shown in FIGS. 4, 7 and 8, a slot 32S is provided in the yoke to allow installation of the cross member 70. After the cross member is positioned within the yoke 32, 42, 52, the sealing cup assembly is inserted through the openings 33, 43 and 53 and connected to the yokes and cross member in the manner described above.

In operation, when the shaft is pivoted with respect to the cross member, the yoke connecting portion 83 moves with the shaft and the cross member connecting portion 87 moves with the cross member. The torsion member 85 stretches to accommodate the relative movement between portions 83 and 87. The amount of torsion allowed by the torsion member 85 is limited, but sufficient to accommodate the amount of pivoting experienced in a downhole drilling coupling.

Thus, it can be appreciated that the use of the sealing cup assembly of the present invention intermediate the yoke and the cross member allows sliding of the surfaces of a universal joint in a hermetically sealed environment. This solves the problems experienced in the prior art which employ non-hermetically sealed universal assemblies.

What is claimed is:

1. A progressive cavity drive train comprising:
   a housing structure;
   a stator, the stator having a longitudinal axis;
   a rotor having a true center, the rotor being located within the stator;
   the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbiting motion of the rotor causing a progression of the cavities in the direction of the axis of the stator;
   a first stub shaft having a longitudinal axis and first and second longitudinal ends, the first end of the first stub shaft being connected to and movable with the rotor, the second end of the first stub shaft comprising a yoke;
   a second stub shaft having a longitudinal axis which is substantially colinear with the axis of the stator and first and second longitudinal ends, the second stub shaft being rotatably mounted about its longitudinal axis within the housing structure, the second end of the second stub shaft comprising a yoke;
   a sealed cross member assembly coupling the yoke formed on the first stub shaft to the yoke formed on the second stub shaft, the cross member assembly comprising:
   a cross member comprising a central body and two sets of pin portions extending from the body, each set of pin portions including two pin portions having coincident axes, the pin portions of one set being transverse to the pin portions of the other set; and
   a sealing cup fixed to each of the pin portions of the cross member, the sealing cup comprising:
   connecting sleeve portion fixed to the pin portion of the cross member; a flexible elastomeric section bonded to the sleeve portion and a hollow cup portion bonded to the elastomeric section and enclosing the end of the pin portion;
   each hollow cup portion having an interior surface and an exterior surface, a portion of the interior surface being in sliding contact with the pin portion enclosed by the sealing cup and the exterior of the cup portion being fixed to a yoke member;
   the elastomeric section of the sealing cup being sufficiently flexible so as to deform to allow pivoting of the pin portion and sleeve portion with respect to the cup portion and yoke member and the sleeve portion being sealingly connected to the pin portion such that the interior of the cup portion is hermetically sealed;
   whereby the sealed cross member assembly couples the first and second stub shafts such that the first stub shaft can rotate about its axis and orbit about the axis of the second stub shaft at the same time the second stub shaft rotates about its longitudinal axis.

2. The progressive cavity drive train of claim 1, wherein the first stub shaft is integrally connected with the rotor.

3. The progressive cavity drive train of claim 1, further comprising a drill bit operatively connected to and driven by the second stub shaft.

4. The drive train of claim 1, further comprising splines formed on the cross member proximate each of the pin portions; and complementary splines formed on the interior surface of the connecting sleeve portion of the sealing cup; whereby the sealing cups are fixed to the pin portions of the cross member in a fluid tight manner by engagement of said complementary splines.

5. The drive train of claim 1, further comprising a cylindrical protruding surface on each of the pin portions, the cylindrical protruding surface being in sliding contact with the interior surface of the cup portion of the sealing cup.

6. The drive train of claim 1, further comprising a radially inward extending surface formed in the interior of the cup portion of the sealing cup, the radially inward extending surface being in contact with a surface of the pin portion which it encloses.

7. The drive train of claim 1, wherein the elastomeric section of the sealing cup comprises an elastomeric ring.

8. The drive train of claim 7, wherein the elastomeric ring further comprises at least one of longitudinal and radial elastomeric extensions, the extensions extending into portions of the connecting sleeve portion and the cup portion to ensure that the elastomeric ring is securely fixed to the sleeve portion and cup portion of the sealing cup.

9. A drilling apparatus comprising:
a drill string;
a progressive cavity device connected to the lower end of the drill string and comprising a stator having a longitudinal axis, a rotor within the stator, the rotor having a true center, and a passageway for flowing fluids through the stator to drive the rotor so as to cause the true center of the rotor to rotate and orbit about the axis of the stator;
a sealed coupling having first and second ends, a first stub shaft at the first end and a second stub shaft at the second end, the first stub shaft having a yoke formed at one end the second stub shaft having a similar yoke formed at an end thereof,
a sealed cross member assembly coupling the yoke formed on the first stub shaft to the yoke formed on the second stub shaft, the cross member assembly comprising:
a cross member comprising two pins, each pin having two ends, the pins being transverse to one another; and
a seal fixed to each of the pins of the cross member, comprising: a first portion fixed to each end of a pin of the cross member, a flexible second portion secured to the second portion and a third portion enclosing the end of the pin; and the third portion being fixed to a yoke member;
the second portion of the seal being flexible so as to deform to allow pivoting of the pin with respect to the yoke member while the interior of the cup portion remains hermetically sealed;
wherein the first stub shaft of the sealed coupling is attached to the rotor and has its axis aligned with the true center of the rotor for rotation therewith; and
a drill bit having a tubular housing connected to the second stub shaft of the sealed coupling so as to rotate with the second stub shaft;
whereby the sealed coupling converts rotor orbiting and rotation into rotational drilling motion about an axis displaced from and parallel to said rotor axis.

10. The drilling apparatus of claim 9, wherein the flexible section of the seal comprises an elastomeric ring.

11. The drilling apparatus of claim 9, wherein the seal is formed entirely of elastomer.

12. A progressive cavity drive train for use in a downhole drilling apparatus, the progressive cavity drive train comprising:
a housing structure;
a stator, the stator having a longitudinal axis;
a rotor having a true center, the rotor being located within the stator;
the stator and rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbiting motion of the rotor causing a progression of the cavities in the direction of the axis of the stator;
a first stub shaft having opposed first and second longitudinal ends, the first stub shaft being secured at the first longitudinal end thereof to the rotor for movement therewith;
a first joint assembly having opposed first and second longitudinal ends, the opposed longitudinal ends of the first joint assembly being pivotable with respect to one another about two transversely arranged axes and the longitudinal ends of the joint assembly being secured to the first stub shaft for movement therewith;
an intermediate shaft having first and second longitudinal ends, the first longitudinal end of the intermediate shaft being secured to the second longitudinal end of the first joint assembly for movement therewith, the first joint assembly thereby connecting the first stub shaft to the intermediate shaft for pivotable movement about the aforesaid two axes;
a second joint assembly having first and second longitudinal ends, the first and second longitudinal ends of the joint assembly being pivotable with respect to one another about two axes, the first longitudinal end of the joint assembly being secured to the second longitudinal end of the intermediate shaft for movement therewith;
a second stub shaft having first and second longitudinal ends, the first longitudinal end of the second stub shaft being connected to the second longitudinal end of the second joint assembly for movement therewith such that the second joint assembly connects the intermediate shaft to the second stub shaft for pivoting movement about the aforesaid two axes;
a drill bit drive shaft, the drill bit drive shaft being mounted for rotation about a predetermined axis and being operatively connected to the drill bit of the downhole drilling assembly for driving the drill bit, the drill bit drive shaft having first and second longitudinal ends, the first longitudinal end of the drill bit drive shaft being secured for movement with the second stub shaft so as to rotate therewith;
wherein the first and second joint assemblies each include a cross member and a sealing cup, the cross member comprising a central body and two sets of pin portions extending from the body, each set of pin portions including two pin portions having coincident axes, the pin portions of one set being transverse to the pin portions of the other set and the sealing cup fixed to each of the pin portions of the cross member, the sealing cup comprising: a connecting sleeve portion encircling and sealingly fixed to the pin portion of the cross member, a flexible elastomeric section fixed to the sleeve portion and a hollow cup portion sealingly fixed to the elastomeric section and enclosing the end of the pin portion, each hollow cup portion having an interior surface and an exterior surface, a portion of the interior surface being in sliding contact with the pin portion enclosed by the sealing cup and the exterior of the cup portion being fixed to a yoke member;

the elastomeric section of the sealing cup being flexible so as to deform to allow pivoting of the pin portion and sleeve portion with respect to the cup portion and yoke member and the sleeve portion being sealingly connected to the pin portion such that the interior of the cup portion is hermetically sealed.

13. The drive train of claim 12, further comprising splines formed on the cross member proximate each of the pin portions; and complementary splines formed on the interior surface of the connecting sleeve portion of the sealing cup; whereby the sealing cups are fixed to the pin portions of the cross member in a fluid tight manner by engagement of said complementary splines.

14. The drive train of claim 12, further comprising a cylindrical protruding surface on each of the pin portions, the cylindrical protruding surface being in sliding contact with the interior surface of the cup portion of the sealing cup.

15. The drive train of claim 12, further comprising a radially inward extending surface formed in the interior of the cup portion of the sealing cup, the radially inward extending surface being in contact with a surface of the pin portion which it encloses.

16. The drive train of claim 12, wherein the elastomeric section of the sealing cup comprises an elastomeric ring.

17. The drive train of claim 16, wherein the elastomeric ring further comprises at least one of longitudinal and radial elastomeric extensions, the extensions extending into portions of the connecting sleeve portion and the cup portion to ensure that the elastomeric ring is securely fixed to the sleeve portion and cup portion of the sealing cup.

18. A progressive cavity drive train for driving a downhole drill bit drive shaft about a single axis, the progressive cavity drive train comprising:

a housing structure;

a stator, the stator having a longitudinal axis;

a rotor having a true center, the rotor being located within the stator; the stator and rotor being arranged with respect to one another such that a plurality of cavities are defined between the rotor and the stator and the rotor being adapted to rotate within the stator such that the cavities between the rotor and stator progress in the direction of the axis of the stator;

a drill bit drive shaft mounted within the housing for rotation about a predetermined axis, the drill bit drive shaft having first and second longitudinal ends, the second longitudinal end being operatively connected to a drill bit for causing rotation of the drill bit about a predetermined axis;

a flexible coupling having first and second longitudinal ends, the first longitudinal end of the flexible coupling being connected to the rotor and the second longitudinal end of the flexible coupling being connected to the first end of the drill bit drive shaft, the flexible coupling comprising a first stub shaft having first and second longitudinal ends, a second stub shaft having first and second longitudinal ends and an intermediate shaft having first and second longitudinal ends, the second longitudinal end of the first stub shaft being pivotably connected to the first longitudinal end of the intermediate shaft for pivoting movement about two transversely disposed axes and the first longitudinal end of the second stub shaft being pivotably connected to the second longitudinal end of the intermediate shaft for pivoting movement about two transversely disposed axes; and wherein the pivotable connection between the first stub shaft and the intermediate shaft and the second stub shaft and the intermediate shaft is provided by a joint assembly which includes a cross member assembly secured to each of the second end of the first stub shaft, the first end of the second stub shaft and the first and second ends of the intermediate shaft, the cross member assembly including a cross member comprising a central body and two sets of pin portions extending from the body, each set of pin portions including two pin portions having coincident axes, the pin portions of one set being transverse to the pin portions of the other set; and a sealing cup fixed to each of the pin portions of the cross member, the sealing cup comprising:

a connecting sleeve portion fixed to the pin portion of the cross member, a flexible elastomeric section secured to the sleeve portion and a hollow cup portion fixed to the elastomeric section and enclosing the end of the pin portion, each hollow cup portion having an interior surface and an exterior surface, a portion of the interior surface being in sliding contact with the pin portion enclosed by the sealing cup and the exterior of the cup portion being fixed to a yoke member;

the elastomeric section of the sealing cup being sufficiently flexible to allow pivoting of the pin portion and sleeve portion with respect to the cup portion and yoke member and the sleeve portion being sealingly connected to the pin portion such that the interior of the cup portion is hermetically sealed.

19. The drilling apparatus of claim 18, further comprising splines formed on the cross member proximate each of the pin portions; and complementary splines formed on the interior surface of the connecting sleeve portion of the sealing cup; whereby the sealing cups are fixed to the pin portions of the cross member in a fluid tight manner by engagement of said complementary splines.

20. The drilling apparatus of claim 18, further comprising a cylindrical protruding surface on each of the pin portions, the cylindrical protruding surface being in sliding contact with the interior surface of the cup portion of the sealing cup.

21. The drilling apparatus of claim 18, further comprising a radially inward extending surface formed in the interior of the cup portion of the sealing cup, the radially inward extending surface being in contact with a surface of the pin portion which it encloses.

22. The drilling apparatus of claim 18, wherein the elastomeric section of the sealing cup comprises an elastomeric ring.

23. The drilling apparatus of claim 22, wherein the elastomeric ring further comprises at least one of longitudinal and radial elastomeric extensions, the extensions extending into portions of the connecting sleeve portion and the cup portion to ensure that the elastomeric ring is securely fixed to the sleeve portion and cup portion of the sealing cup.

24. A progressive cavity drive train for causing rotation of a drill bit drive shaft about a single axis, the progressive cavity drive train comprising:

a housing structure;

a stator, the stator having a longitudinal axis;

a rotor having a true center, the rotor being located within the stator; the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbit causing a progression of cavities in the direction of the axis of the stator;

a first stub shaft having a longitudinal axis and first and second longitudinal ends, the first end of the first stub shaft being connected to and movable with the rotor, the second end of the first stub shaft comprising a yoke member;

an intermediate shaft, the intermediate shaft having first and second longitudinal ends, a yoke member formed on each of the ends of the intermediate shaft;

a cross member assembly extending between the yoke formed on the intermediate shaft and the yoke formed on the first stub shaft, the cross member assembly comprising: a cross member comprising a central body and two sets of pin portions extending from the body, each set of pin portions including two pin portions having coincident axes, the pin portions of one set being transverse to the pin portions of the other set; and a sealing cup fixed to each of the pin portions of the cross member, the sealing cup comprising: a connecting sleeve portion fixed to the pin portion of the cross member; a flexible elastomeric section secured to the sleeve portion and a hollow cup portion fixed to the elastomeric section and enclosing the end of the pin portion; each hollow cup portion having an interior surface and an exterior surface, a portion of the interior surface being in sliding contact with the pin portion enclosed by the sealing cup and the exterior of the cup portion being fixed to a yoke member; the elastomeric section of the sealing cup being sufficiently flexible to allow pivoting of the pin portion and sleeve portion with respect to the cup portion and yoke member and the sleeve portion being sealingly connected to the pin portion such that the interior of the cup portion is hermetically sealed;

a second stub shaft having first and second longitudinal ends and a longitudinal axis which is substantially colinear with the axis of the stator, the second stub shaft being rotatably mounted about its longitudinal axis within the housing structure, the second end of the second stub shaft being operatively connected to the drill bit drive shaft for rotating the drill bit drive shaft about a predetermined axis, the first end of the second stub shaft being formed with a yoke member;

a cross member assembly connecting the yoke member formed on the second stub shaft and the yoke member formed on the second end of the intermediate shaft, the cross member assembly comprising: a cross member comprising a central body and two sets of pin portions extending from the body, each set of pin portions including two pin portions having coincident axes, the pin portions of one set being transverse to the pin portions of the other set; and a sealing cup fixed to each of the pin portions of the cross member, the sealing cup comprising: a connecting sleeve portion fixed to the pin portion of the cross member, a flexible elastomeric section secured to the sleeve portion and a hollow cup portion fixed to the elastomeric section and enclosing the end of the pin portion, each hollow cup portion having an interior surface and an exterior surface, a portion of the interior surface being in sliding contact with the pin portion enclosed by the sealing cup and the exterior of the cup portion being fixed to a yoke member;

the elastomeric section of the sealing cup being sufficiently flexible to allow pivoting of the pin portion and sleeve portion with respect to the cup portion and yoke member and the sleeve portion being sealingly connected to the pin portion such that the interior of the cup portion is hermetically sealed and all moving parts of the coupling are perfectly isolated from the surrounding environment.

25. The drive train of claim 24, further comprising splines formed on the cross member proximate each of the pin portions; and complementary splines formed on the interior surface of the connecting sleeve portion of the sealing cup; whereby the sealing cups are fixed to the pin portions of the cross member in a fluid tight manner by engagement of said complementary splines.

26. The drive train of claim 24, further comprising a cylindrical protruding surface on each of the pin portions, the cylindrical protruding surface being in sliding contact with the interior surface of the cup portion of the sealing cup.

27. The drive train of claim 24, further comprising a radially inward extending surface formed in the interior of the cup portion of the sealing cup, the radially inward extending surface being in contact with a surface of the pin portion which it encloses.

28. The drive train of claim 24, wherein the elastomeric section of the sealing cup comprises an elastomeric ring.

29. The drive train of claim 28, wherein the elastomeric ring further comprises at least one of longitudinal and radial elastomeric extensions, the extensions extending into portion of the connecting sleeve portion and the cup portion to ensure that the elastomeric ring is securely fixed to the sleeve portion and cup portion of the sealing cup.

* * * * *